United States Patent
LeMahieu et al.

(10) Patent No.: US 9,501,316 B2
(45) Date of Patent: *Nov. 22, 2016

(54) INSTANTIATING VIRTUAL APPLIANCES OF A STORAGE ARRAY

(71) Applicant: EMC Corporation, Hopkinton, MA (US)

(72) Inventors: Paul LeMahieu, Pasadena, CA (US); Steven Halzel, Ashland, MA (US); Jane M. Lawler, Lexington, MA (US); Jake Frazier, Austin, TX (US)

(73) Assignee: EMC Corporation, Hopkinton, MA (US)

( * ) Notice: Subject to any disclaimer, the term of this patent is extended or adjusted under 35 U.S.C. 154(b) by 446 days.

This patent is subject to a terminal disclaimer.

(21) Appl. No.: 14/066,252

(22) Filed: Oct. 29, 2013

(65) Prior Publication Data

US 2014/0130045 A1 May 8, 2014

Related U.S. Application Data

(63) Continuation of application No. 12/983,249, filed on Dec. 31, 2010, now Pat. No. 8,601,472.

(51) Int. Cl.
  *G06F 9/46* (2006.01)
  *G06F 9/455* (2006.01)
  *G06F 9/48* (2006.01)

(52) U.S. Cl.
  CPC ............ *G06F 9/48* (2013.01); *G06F 9/45558* (2013.01); *G06F 2009/45562* (2013.01)

(58) Field of Classification Search
  None
  See application file for complete search history.

(56) References Cited

U.S. PATENT DOCUMENTS

| | | | | |
|---|---|---|---|---|
| 8,601,472 B1 * | 12/2013 | LeMahieu | ............... | G06F 9/48 718/1 |
| 2008/0022290 A1 * | 1/2008 | Ochiai | ............... | H04L 41/5041 719/315 |
| 2008/0201414 A1 | 8/2008 | Amir et al. | | |
| 2008/0201479 A1 | 8/2008 | Husain et al. | | |
| 2009/0276771 A1 * | 11/2009 | Nickolov | ............... | G06F 9/4856 717/177 |
| 2009/0300604 A1 * | 12/2009 | Barringer | ............ | G06F 11/3664 717/178 |
| 2009/0313620 A1 | 12/2009 | Sedukhin et al. | | |
| 2010/0205303 A1 * | 8/2010 | Chaturvedi | ............ | G06F 21/126 709/226 |
| 2011/0029970 A1 * | 2/2011 | Arasaratnam | ....... | G06F 9/45558 718/1 |
| 2011/0071983 A1 * | 3/2011 | Murase | .................. | G06F 9/5088 707/649 |
| 2011/0107406 A1 * | 5/2011 | Frost | .................... | G06F 9/45558 726/6 |
| 2011/0314155 A1 * | 12/2011 | Narayanaswamy | .. | G06F 9/4856 709/226 |
| 2012/0131578 A1 | 5/2012 | Ciano et al. | | |
| 2012/0159232 A1 * | 6/2012 | Shimada | ............. | G06F 11/1662 714/3 |

FOREIGN PATENT DOCUMENTS

| | | |
|---|---|---|
| CN | 101216777 | 7/2008 |
| CN | 102918503 | 2/2013 |

OTHER PUBLICATIONS

Virtual Appliance, Wikipedia, Dec. 10, 2010, retrieved from http://web.archive.org/web/20101210211612/http:/en.wikipedia.org/wiki/Virtual_appliance.

* cited by examiner

*Primary Examiner* — Abdullah Al Kawsar
*Assistant Examiner* — Bradley Teets
(74) *Attorney, Agent, or Firm* — Van Pelt, Yi & James LLP

(57) ABSTRACT

A method, article of manufacture, and apparatus for efficiently processing information. In some embodiments, this includes selecting a service to add to a storage array, determining a virtual appliance associated with the service, and instantiating the virtual appliance. In some embodiments, instantiating the virtual appliance includes instantiating an image of the virtual appliance.

15 Claims, 4 Drawing Sheets

INSTANTIATING VIRTUAL APPLIANCES OF A STORAGE ARRAY

CROSS REFERENCE TO OTHER APPLICATIONS

This application is a continuation of co-pending U.S. patent application Ser. No. 12/983,249, entitled INSTANTIATING VIRTUAL APPLIANCES filed Dec. 31, 2010 which is incorporated herein by reference for all purposes.

FIELD OF THE INVENTION

The present invention relates generally to information storage systems, and more particularly, to systems and methods of managing information storage systems.

BACKGROUND OF THE INVENTION

Modern information storage systems typically require a variety of services. These services include file management, backup, deduplication, search, file tiering, and ediscovery, among others.

Conventionally, when an information storage system administrator wanted to add a service, the administrator would buy a new appliance and integrate the appliance with the information storage system. However, as information storage systems grow larger and more complex, integrating the appliance is becoming increasingly difficult. For example, in a system with 600 NAS heads, a service that requires 2 appliances per head would result in the addition of 1200 appliances. The addition of a large number of appliances may cause several issues, such as increased power consumption, and reduced physical space, among others. Further, the addition of a large number of appliances may not be a trivial task. The installation of many appliances may be a lengthy and expensive process. Similarly, removing services and corresponding appliances may require significant resources.

There is a need, therefore, for an improved method, article of manufacture, and apparatus for managing information storage systems.

BRIEF DESCRIPTION OF THE DRAWINGS

The present invention will be readily understood by the following detailed description in conjunction with the accompanying drawings, wherein like reference numerals designate like structural elements, and in which.

DETAILED DESCRIPTION

Figure 1:
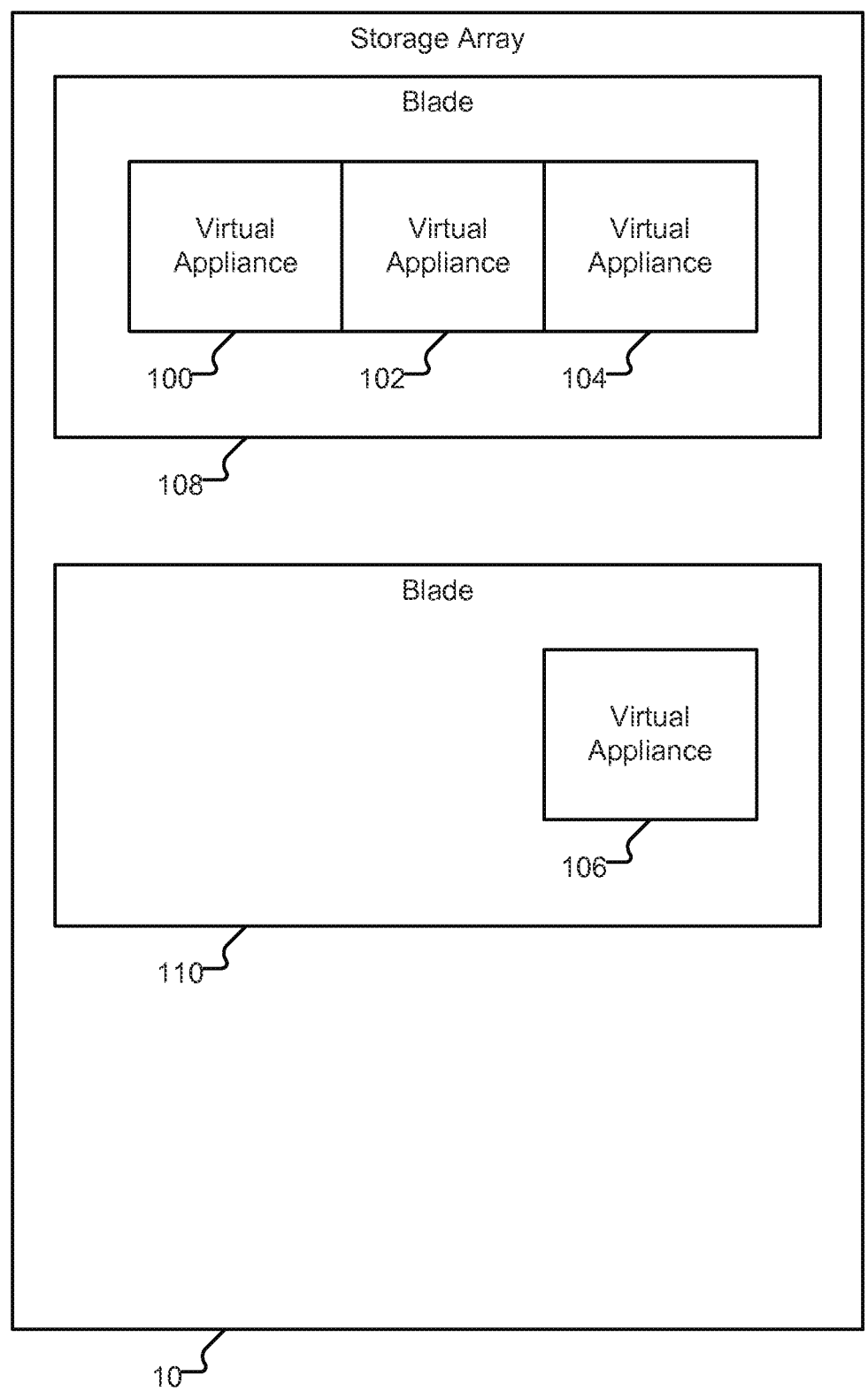
FIG. 1 is a diagram of an embodiment of a backup system in accordance with the invention.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer readable medium such as a computer readable storage medium containing computer readable instructions or computer program code, or as a computer program product, comprising a computer usable medium having a computer readable program code embodied therein. In the context of this disclosure, a computer usable medium or computer readable medium may be any medium that can contain or store the program for use by or in connection with the instruction execution system, apparatus or device. For example, the computer readable storage medium or computer usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means system, apparatus or device for storing information. Alternatively or additionally, the computer readable storage medium or computer usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded in whole or in part through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to an information storage system in the form of a storage system configured to store files, but it should be understood that the principles of the invention are not limited to information storage systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

Conventional storage arrays typically contain a wide variety of physical appliances. Physical appliances typically provide services to the storage array. For example, these physical appliances may be WAN accelerator appliances, backup appliances, and deduplication appliances, among others. Adding several physical appliances to a storage device may be expensive, time consuming, and may complicate the management of the storage system. As a result, many system administrators do not choose to use implement some physical appliances.

The enhanced techniques described herein simplify the deployment and management of appliances by virtualizing them. In some embodiments, standard virtualization techniques may be applied, such as those provided by VMWare, Microsoft, and others. In some embodiments, templates for virtual appliances may be created by using the Open Virtual Format (OVF). When creating the virtual appliance, several parameters may be set, such as the IP address of the virtual appliance, administrator passwords, if applicable, and other basic networking configurations, among others.

In some embodiments, virtual appliances may be stored on a blade of a storage array. In some embodiments, the blade may have ESX, a product offered by VMWare, installed. vCenter, a product also offered by VMWare, may be also used.

FIG. 1 illustrates a storage array in accordance with some embodiments. Storage Array 10 contains Blades 108 and 110. Stored on Blade 108 are Virtual Appliances 100, 102, and 104. Stored on Blade 110 is Virtual Appliance 106. Virtual appliances provide services that physical appliances provide (e.g. deduplication, backup, WAN acceleration, ediscovery, etc.). Though FIG. 1 illustrates three virtual appliances on a blade, and one virtual appliance on another, many other combinations are possible. For example, one blade may hold a dozen virtual appliances, another blade may hold six, and yet another blade may hold three. Any number of virtual appliances may fit on a blade, as long as the blade has the resources to support the number of virtual appliances (e.g. enough storage space, processing power, etc.). Further, a storage array may hold any number of blades, as long as the storage array has the resources to support the blades (e.g. enough racks, etc.). Multiple copies of a virtual appliance may be stored on a single blade or across multiple blades. This may be preferable in cases where additional computing resources, or higher availability is desired for the virtual appliance.

Replacing physical appliances with virtual appliances provides multiple benefits. One benefit is reduction of hardware. Since many physical devices may be replaced with a virtual appliance, less hardware is used. Another benefit is reduction in energy use. Having many physical devices running produces a lot of heat and consumes a lot of energy. By replacing physical devices with virtual appliances, less heat may be generated, and less energy may be consumed.

By using virtual appliances, a storage array may have several services, such as deduplication, and backup, among others, without having a wide variety of equipment from different vendors (e.g. service providers). No external hardware is needed—only the blades in the storage array are needed to store the virtual appliances. In this way, virtual appliances may resemble storage array features, rather than additional hardware deployments.

In some embodiments, virtual appliances may be included in a standard storage array, and may be provisioned as standard array features. Provisioning virtual appliances may instantiate virtual appliances from included images and provides basic configuration (e.g. licensing) and networking. For example, a distributor of storage arrays may have a default storage array which includes multiple virtual appliances.

In some embodiments, virtual appliances may be stored in a blade, but not activated. This may be preferable in instances where a user does not want, or has no need for all of the services provided by every virtual appliance. For example, a blade may come by default with a deduplication virtual appliance, a search virtual appliance, and a backup virtual appliance. The user may not want a search appliance. In this case, the user may activate only the deduplication and backup virtual appliances when the user. In some embodiments, activation may be accomplished by receiving a license from the distributor of the storage array, and entering license information to instantiate the desired virtual appliances.

In some embodiments, it may be preferable to dynamically deploy the virtual appliances. Using the example above, at first the user may want deduplication and backup virtual appliances. However, at a later time, the user may decide that the deduplication is no longer needed, and the user may decommission the deduplication virtual appliance. The user may also decide to add search services to the storage array, and instantiate the search virtual appliance. By using instantiating and decommissioning virtual appliances dynamically, the user is able to better manage the storage array. The user does not need to worry about adding new physical appliances and installing the associated hardware, or removing physical appliances and uninstalling the associated hardware.

Virtual appliances that were not part of the default storage array may also be added to the storage array. For example, suppose a storage array included by default a backup virtual appliance and a deduplication virtual appliance. In some embodiments, a user may have the option to purchase or instantiate a virtual appliance through an interface, such as an application store, or management software (such as Unisphere provided by EMC Corporation), among others. For example, a user may open the interface, and the interface may provide details on installed or instantiated virtual appliances. In this example, the interface will indicate that the backup virtual appliance and deduplication virtual appliance are installed. The interface may allow the user to perform certain actions, such as purchasing a new virtual appliance, downloading a new virtual appliance (subject to certain conditions, such as payment), decommissioning a currently installed virtual appliance, updating a virtual appliance, and viewing available virtual appliances, among others. When retrieving authorization information, such as license keys after purchasing a virtual appliance, the interface may connect to the distributor of the storage array to download the necessary data. This data may be an image of a virtual appliance, which may be instantiated on the storage array. The interface may also connect to third party providers of virtual appliances. The interface itself may run on the storage array, or on another computer system.

Figure 2:
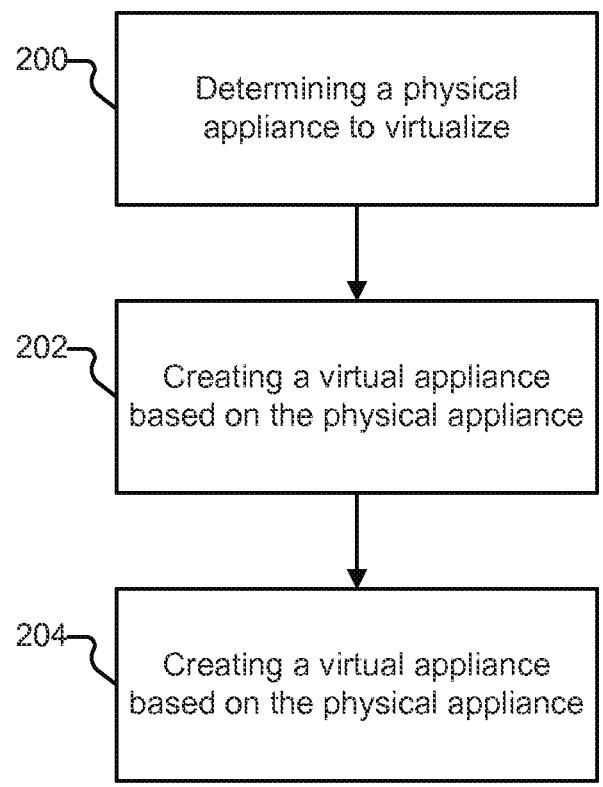
FIG. 2 is a flowchart of a method to process information in accordance with some embodiments.

FIG. 2 illustrates a method to process information in accordance with some embodiments. In step 200, a physical appliance to virtualize is determined. In step 202, a virtual appliance is created based on the physical appliance. In step 204, the virtual appliance is stored in a storage array.

Figure 3:
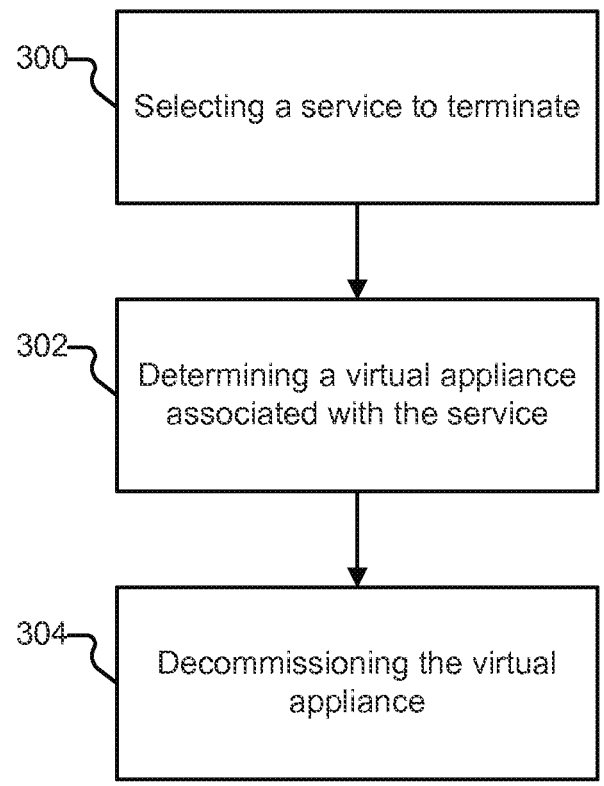
FIG. 3 is a flowchart of a method to process information in accordance with some embodiments.

FIG. 3 illustrates a method to process information in accordance with some embodiments. In step 300, a service to terminate is selected. In step 302, a virtual appliance associated with the service is determined. In step 304, the virtual appliance is decommissioned.

Figure 4:
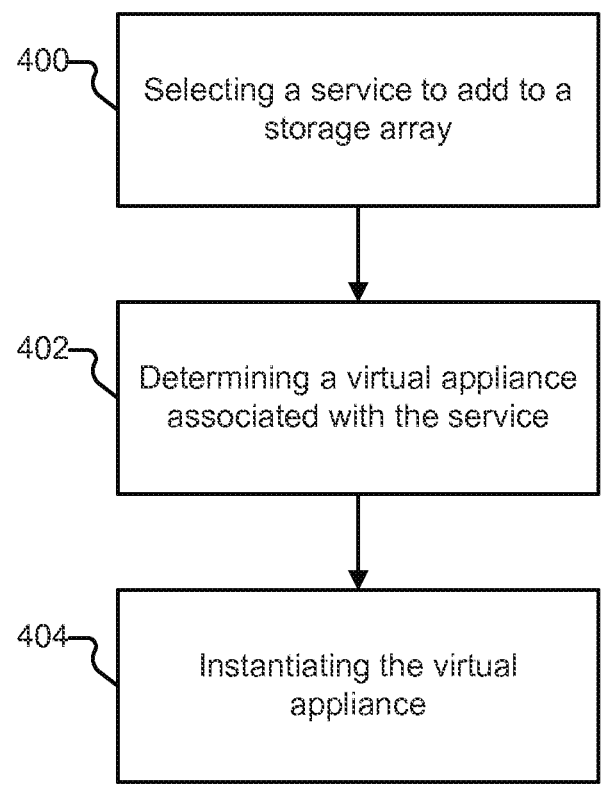
FIG. 4 is a flowchart of a method to process information in accordance with some embodiments.

FIG. 4 illustrates a method to process information in accordance with some embodiments. In step 400, a service to add to a storage array is selected. In step 402, a virtual appliance associated with the service is determined. In step 404, the virtual appliance is instantiated.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

Though the above has been described with reference to the term "backup" for illustrative purposes, the present invention is equally applicable to all forms of data duplication. These forms of data duplication include replication and archiving, among others.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method for processing information, comprising:
   providing a user with a storage array comprising a set of one or more blades on which a default set of one or more virtual appliance images is preinstalled, wherein each of the virtual appliance images are associated with a virtual appliance that is configured to provide a corresponding service that has not yet been activated at the storage array;
   receiving from the user an indication of a need for a first service with respect to the storage array;
   determining, based at least in part on the indication, a first virtual appliance that provides the first service; and
   using a corresponding first virtual appliance image included in the default set of one or more virtual appliance images, and stored in a corresponding blade included in the set of one or more blades, to instantiate the first virtual appliance, wherein the instantiation creates a running instance of the first virtual appliance on the corresponding blade,
   wherein the running instance of the first virtual appliance is included in a dynamic set of one or more virtual appliances running on the set of one or more blades, wherein the dynamic set of one or more virtual appliances is changeable based on required services, by the user, by doing one or both of instantiating additional virtual appliance instances as newly needed and decommissioning previously-instantiated virtual appliance instances as they are no longer needed without adding or removing physical devices to or from the storage array,
   wherein instantiating the first virtual appliance further includes activating the first virtual appliance at least in part by entering a license key associated with the first virtual appliance from a distributor of the storage array.

2. The method as recited in claim 1, further comprising not using a corresponding second virtual appliance image included in the default set of one or more virtual appliance images to instantiate a second virtual appliance that provides a second service.

3. The method as recited in claim 1, further comprising receiving from the user an indication that the first service is no longer needed, determining that the first service is associated with the first virtual appliance, and decommissioning the first virtual appliance including by removing the running instance of the first virtual appliance from the corresponding blade.

4. The method as recited in claim 1, further comprising receiving at a time subsequent to instantiation and activation of the first virtual appliance, an indication of interest in a second service associated with a second virtual appliance that has not yet been activated.

5. The method as recited in claim 4, further comprising instantiating and activating a running instance of the second virtual appliance, based at least in part on the indication.

6. A system for processing information, the system comprising:
   a storage array; and
   a processor configured to:
      provide a user with a storage array comprising a set of one or more blades on which a default set of one or more virtual appliance images is preinstalled, wherein each of the virtual appliance images are associated with a virtual appliance that is configured to provide a corresponding service that has not yet been activated at the storage array;
      receive from the user an indication of a need for a first service with respect to the storage array;
      determine, based at least in part on the indication, a first virtual appliance that provides the first service; and
      use a corresponding first virtual appliance image included in the default set of one or more virtual appliance images, and stored in a corresponding blade included in the set of one or more blades, to instantiate the first virtual appliance, wherein the instantiation creates a running instance of the first virtual appliance on the corresponding blade,
      wherein the running instance of the first virtual appliance is included in a dynamic set of one or more virtual appliances running on the set of one or more blades, wherein the dynamic set of one or more virtual appliances is changeable based on required services, by the user, by doing one or both of instantiating additional virtual appliance instances as newly needed and decommissioning previously-instantiated virtual appliance instances as they are no longer needed without adding or removing physical devices to or from the storage array,
      wherein instantiating the first virtual appliance further includes activating the first virtual appliance at least in part by entering a license key associated with the first virtual appliance from a distributor of the storage array.

7. The system as recited in claim 6, further comprising not using a corresponding second virtual appliance image included in the default set of one or more virtual appliance images to instantiate a second virtual appliance that provides a second service.

8. The system as recited in claim 6, further comprising receiving from the user an indication that the first service is no longer needed, determining that the first service is associated with the first virtual appliance, and decommissioning the first virtual appliance including by removing the running instance of the first virtual appliance from the corresponding blade.

9. The system as recited in claim 6, wherein the processor is further configured to receive at a time subsequent to instantiation and activation of the first virtual appliance, an indication of interest in a second service associated with a second virtual appliance that has not yet been activated.

10. The system as recited in claim 9, wherein the processor is further configured to instantiate and activate a running instance of the second virtual appliance, based at least in part on the indication.

11. A computer program product for storing data, comprising a non-transitory computer readable medium having program instructions embodied therein and when executed, a processor performs the steps of:
providing a user with a storage array comprising a set of one or more blades on which a default set of one or more virtual appliance images is preinstalled, wherein each of the virtual appliance images are associated with a virtual appliance that is configured to provide a corresponding service that has not yet been activated at the storage array;
receiving from the user an indication of a need for a first service with respect to the storage array;
determining, based at least in part on the indication, a first virtual appliance that provides the first service; and
using a corresponding first virtual appliance image included in the default set of one or more virtual appliance images, and stored in a corresponding blade included in the set of one or more blades, to instantiate the first virtual appliance, wherein the instantiation creates a running instance of the first virtual appliance on the corresponding blade,
wherein the running instance of the first virtual appliance is included in a dynamic set of one or more virtual appliances running on the set of one or more blades, wherein the dynamic set of one or more virtual appliances is changeable based on required services, by the user, by doing one or both of instantiating additional virtual appliance instances as newly needed and decommissioning previously-instantiated virtual appliance instances as they are no longer needed without adding or removing physical devices to or from the storage array,
wherein instantiating the first virtual appliance further includes activating the first virtual appliance at least in part by entering a license key associated with the first virtual appliance from a distributor of the storage array.

12. The computer program product as recited in claim 11, further comprising computer instructions for not using a corresponding second virtual appliance image included in the default set of one or more virtual appliance images to instantiate a second virtual appliance that provides a second service.

13. The computer program product as recited in claim 11, further comprising computer instructions for receiving from the user an indication that the first service is no longer needed, determining that the first service is associated with the first virtual appliance, and decommissioning the first virtual appliance including by removing the running instance of the first virtual appliance from the corresponding blade.

14. The computer program product as recited in claim 11, further comprising computer instructions for receiving at a time subsequent to instantiation and activation of the first virtual appliance, an indication of interest in a second service associated with a second virtual appliance that has not yet been activated.

15. The computer program product as recited in claim 14, further comprising computer instructions for instantiating and activating a running instance of the second virtual appliance, based at least in part on the indication.

* * * * *